United States Patent [19]

Weir et al.

[11] 4,443,253

[45] Apr. 17, 1984

[54] RECOVERY OF ZINC FROM ZINC CONTAINING SULPHIDIC MATERIALS

[75] Inventors: Donald R. Weir; Ian M. Masters, both of Fort Saskatchewan, Canada

[73] Assignee: Sherritt Gordon Mines Limited, Toronto, Canada

[21] Appl. No.: 417,829

[22] Filed: Sep. 14, 1982

[30] Foreign Application Priority Data

Jun. 3, 1982 [CA] Canada .................................. 404390

[51] Int. Cl.³ .......................... C22B 19/00; C01G 5/00; C01G 21/00; C01B 17/027
[52] U.S. Cl. ........................................ 75/120; 204/119; 423/27; 423/41; 423/98; 423/109; 423/567 R; 423/140
[58] Field of Search .................... 423/109, 101, 27, 41, 423/98, 567 R, 567 A, 140; 75/120, 118 R; 204/119

[56] References Cited

U.S. PATENT DOCUMENTS

| | | | |
|---|---|---|---|
| 3,510,414 | 5/1970 | Orlandini | 423/109 |
| 3,867,268 | 2/1975 | Kawulka | 204/119 |
| 4,004,991 | 6/1977 | Velttman | 204/119 |
| 4,063,933 | 12/1977 | Peters | 204/119 |

Primary Examiner—Edward J. Meros
Assistant Examiner—Robert L. Stoll
Attorney, Agent, or Firm—Robert F. Delbridge; Arne I. Fors

[57] ABSTRACT

A process for recovering zinc from zinc-containing sulphidic material also containing iron and from zinc oxide containing material. Zinc-containing sulphidic material is leached under oxidizing conditions at a temperature in the range of from about 130° to about 170° C. in aqueous sulphuric acid solution with an initial stoichiometric excess of sulphuric acid relative to the zinc content of the sulphidic material to form a leach slurry containing dissolved zinc and iron. The leach step is continued until a substantial amount of zinc has been dissolved from the sulphidic material. Zinc oxide containing material is then added to the leach slurry to raise the pH of the slurry to a value in the range of from about 4.5 to about 5.5 to precipitate dissolved iron and form an iron-containing residue and a relatively iron-free leach solution. The residue is separated from the leach solution, and the leach solution is treated to recover zinc.

12 Claims, 1 Drawing Figure

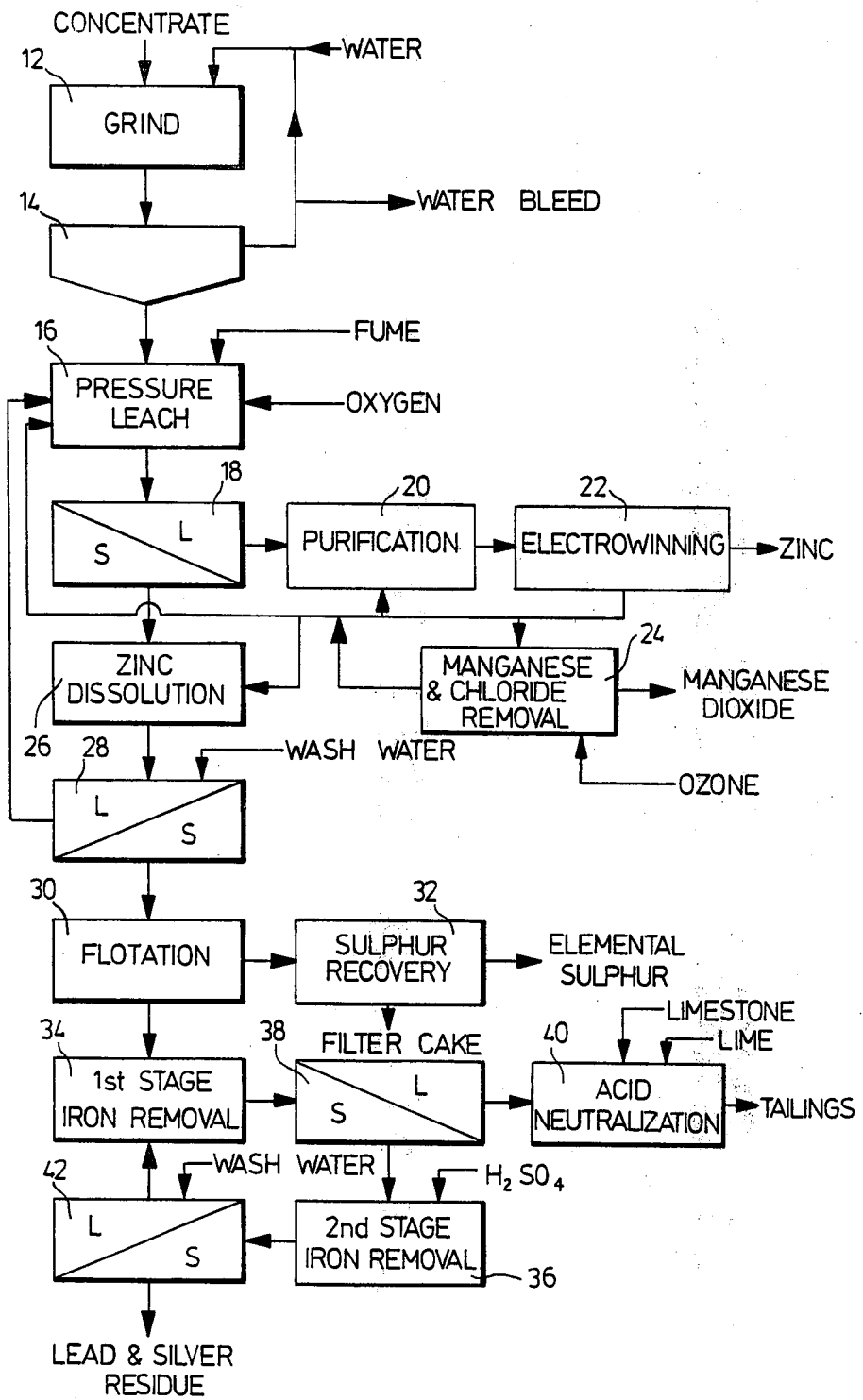

RECOVERY OF ZINC FROM ZINC CONTAINING SULPHIDIC MATERIALS

This invention relates to the recovery of zinc from zinc-containing sulphidic material which also contains iron.

It is known to recover zinc from zinc-containing sulphidic material by leaching the material under oxidizing conditions at elevated temperature to produce a residue containing elemental sulphur and a leach solution containing dissolved zinc. After separation from the residue and after carrying out any necessary purification steps, the leach solution is electrolyzed to produce elemental zinc. Most zinc-containing sulphidic material normally also contains iron, and it is known that the presence of iron is desirable because it assists the oxidation leaching of sulphidic material and hence assists in obtaining adequate dissolution of zinc. To further assist the dissolution of zinc, it is usual for the leach to be commenced with a slight stoichiometric excess of sulphuric acid relative to the amount of zinc in the zinc-containing material, for example with about 10% excess sulphuric acid.

However, with such a stoichiometric excess, some iron is also dissolved, and this is present in the leach solution. Because the subsequent zinc electrolysis step requires that the zinc containing solution to be electrolyzed be substantially iron-free, it has been necessary to remove iron in a purification step, even though the leach may have been conducted in such a way that a minimal amount of iron is dissolved.

According to the present invention, a zinc recovery process comprises leaching zinc-containing sulphidic material under oxidizing conditions at a temperature in the range of from about 130° to about 170° C. in aqueous sulphuric acid solution with an initial stoichiometric excess of sulphuric acid relative to the zinc content of the sulphidic material to form a leach slurry containing dissolved zinc and iron, continuing the leach step until a substantial amount of zinc has been dissolved from the sulphidic material, adding zinc oxide containing material to the leach slurry to raise the pH of the slurry to a value in the range of from about 4.5 to about 5.5 to precipitate dissolved iron and form an iron-containing residue and a relatively iron-free leach solution, separating the residue from the leach solution, and treating the leach solution to recover zinc.

With a process in accordance with the present invention, the leach solution does not have to be subjected to an additional iron-removal step before electrolysis.

The leach step may be continued until at least about 95% by weight zinc has been dissolved from the zinc sulphidic material before adding the zinc oxide containing material, and the zinc oxide containing material may be added to the leach slurry to raise the Ph of the slurry to about 5. The zinc sulphidic material may contain by weight from about 45 to about 55% zinc and from about 8 to about 15% iron.

The zinc oxide containing material may contain by weight from about 50 to about 70% zinc, and may comprise zinc oxide fume obtained from lead blast furnace slag.

The initial stoichiometric excess of sulphuric acid in the leach step may be from about 30 to about 100%, more preferably from about 40 to about 60%.

The iron-containing residue may also contain zinc oxide containing material, and the residue may be leached in a second leach step in aqueous sulphuric acid solution to form a further leach solution containing dissolved zinc and a further residue, with the further residue then being separated from the further leach solution. The second leach step may be carried out at atmospheric pressure at a pH in the range of from about 2 to about 3 and a temperature in the range of from about 60° to about 90° C. The further leach solution may be recycled to the first-mentioned leach step.

The further residue may be treated to separate elemental sulphur and unreacted zinc-containing material therefrom and form a further iron-containing residue. The zinc containing sulphidic material and/or the zinc oxide containing material may also contain lead and/or silver, with the further iron-containing residue also containing lead and/or silver. The further iron-containing residue may be leached in aqueous sulphuric acid solution in an iron removal step to dissolve iron and form a residue enriched in lead and/or silver.

The iron removal step may comprise a first stage in which the iron-containing residue is leached in leach solution from a second stage to form an intermediate residue and an iron-containing solution, the iron-containing solution being separated from the intermediate residue, the intermediate residue then being leached in the second stage in aqueous sulphuric acid solution stronger than that in the first stage to form the enriched residue and a leach solution and the leach solution being separated from the enriched residue and recycled to the first stage.

One embodiment of the invention will now be described, by way of example, with reference to the accompanying drawing which shows a diagrammatic view of a zinc recovery process.

Referring to the drawing, the process in accordance with this embodiment of the invention is used to recover zinc from a zinc-containing sulphidic concentrate containing by weight about 55% zinc, about 35% sulphur, about 9% iron, about 1% lead, about 1% manganese, about 0.5% copper, about 200 ppm (parts per million) fluoride about 300 ppm chloride and about 25 ppm silver.

The zinc concentrate is ground in a grinding step 12 to a small size, for example at least about 95% less than 325 Tyler mesh (44 microns). Water is added in the grinding step, and the resultant ground concentrate slurry is thickened in a thickener 14 to 70% solids by weight. Up to about 75% of the chloride present in the concentrate is dissolved during the grinding step 12, and a portion of the thickener overflow is bled from the system to remove chloride ions, the main portion of the thickener overflow being returned to the grinding step 12 with the addition of makeup water.

The concentrate slurry then passes to a leach step 16 where slurry is leached in an autoclave in aqueous sulphuric acid solution from a zinc electrolysis step and from a separation step which will be referred to later, such that there is an initial stoichiometric excess of sulphuric acid relative to the zinc in the zinc concentrate of about 50%. The leach step 16 is carried out under a partial oxygen pressure of about 700 kPa at a temperature of about 150° C.

The leach step 16 is continued until over 97% of the zinc in the zinc sulphidic material has dissolved, with a correspondingly high amount of iron also being dissolved. Typically, the leach step 16 may be continued for about 60 minutes for this purpose. At this stage, a slurry of ground zinc oxide fume is added, the zinc oxide fume being zinc oxide containing material obtained from lead blast furnace slag and containing by weight about 65% zinc, about 12% lead and about 30 ppm silver. The amount of zinc oxide fume added is such as to raise the pH to about 5, and typically this will require an overall charge ratio of zinc in the sulphidic material and zinc in the fume of about 2:1. In a relatively short time, for example about 10 minutes, most of the dissolved iron is precipitated, such that there is less than about 10 mg/L iron remaining in solution. Such iron precipitation also assists in precipitation of arsenic, antimony, fluoride and other impurities which may have been dissolved from the zinc-containing material during the leach step.

The leached slurry then passes to a liquid/solid separation step 18 from which the leach solution passes to a purification step 20 where the leach solution is purified in known manner, for example by the addition of zinc dust to cause cementation of impurities, and the purified leach solution passes to an electrolysis step 22 from which elemental zinc is obtained. In view of the high amount of iron precipitated by the addition of zinc oxide fume, no additional iron removal step is necessary prior to the electrolysis step. The leach solution passed to the electrolysis step 22 will typically contain about 150 g/L zinc and have a pH of about 5 and, after electrolysis, the spent electrolyte solution will typically contain about 50 g/L zinc and about 180 g/l sulphuric acid. The spent solution is recycled partly to the leach step 16, partly to a second leach step which will be described later, and a minor portion is recycled to the purification step 20. A portion of the recycled solution is treated with ozone in a manganese and chloride removal step 24 to remove dissolved manganese and chloride as manganese dioxide and chlorine gas, this step being the subject of U.S. Pat. No. 4,290,866, issued Sept. 22, 1981 and U.S. Pat. No. 4,379,037 issued Apr. 5, 1983.

The leach residue from the separation step 18 contains an appreciable amount of undissolved zinc as zinc oxide fume, and is treated in a second leach step 26 with spent solution from the electrolysis step 22, the second leach step 26 being carried out under atmospheric pressure and a temperature of about 65° C. The second leach step 26 can be carried out at a pH of 2 to 3 with a sulphuric acid concentration of about 3 g/l, and the overall zinc extraction from the zinc oxide fume can be increased in this manner to about 97%. The low acid level in this second leach step 26 lessens the extent of re-dissolution of impurities such as iron. Typically, the second leach step 26 may be carried out for about 30 minutes.

After the second leach step 26, the resultant slurry proceeds to a liquid/solids separation step 28 in which wash water is added. The leach solution containing about 150 g/l zinc and the redissolved impurities including iron is recycled to the pressure leach step 16. The washed residue passes to a flotation step 30 to produce a flotation concentrate containing most of the elemental sulphur and unreacted zinc-containing material, and tailings containing most of the iron, lead and silver. The flotation concentrate is treated in a sulphur recovery step 32 in which the sulphur is melted and separated from the unmelted fraction by filtration to produce a high grade sulphur product, and a remaining filter cake which contains unreacted zinc-containing material and entrained elemental sulphur. The filter cake may be recycled to the grinding step 12 if desired.

The flotation tailings typically contain about 27% iron, 18% lead and 85 ppm silver. The lead may be present partly as lead jarosite and partly as lead sulphate. The tailings are treated in a two-stage countercurrent iron removal step, with a first stage 34 and second stage 36. In the first stage 34, the tailings are leached with solution from the second stage 36 to dissolve the more readily soluble iron oxide.

The resultant slurry is then passed to a liquid/solids separation step 38, and the resultant iron-containing solution is neutralized with lime in a neutralization step 40 to produce trailings which can be disposed of as desired. The intermediate residue from the separation step 38 proceeds to the second stage 36 where concentrated sulphuric acid is added to decompose the lead jarosite. The resultant slurry passes to a liquid/solid separation step 42 to which wash water is added, and the lead and silver enriched residue therefrom is suitable for treatment in a lead smelter. In this way, substantially all of the iron sulphate can be dissolved, together with about 70% lead jarosite, to produce a silver and lead enriched residue containing for example about 37% lead, 8% iron, and 86 ppm silver. The liquid is recylced to the first iron removal stage 34.

Examples of the invention will now be described.

EXAMPLE 1—PRESSURE LEACH

Zinc concentrate analysed Zn-53.8%, Fe-8.47%, S-31.5%, Pb-0.94%, Ag-20 g/t (ppm), F-200 ppm. The material was ground to 98.6% minus 44 μm and introduced into a titanium lined autoclave together with 2.5 L of synthetic return electrolyte analyzing Zn-50 g/L, $H_2SO_4$-180 g/L. The charge of zinc concentrate to electrolyte was 148 g/L, resulting in a 51% stoichiometric excess of acid required for the zinc in the concentrate. A surface active agent (Lignosol BD) was added to ensure high zinc extraction. The charge was heated with agitation under a low oxygen partial pressure (350 kPa) to 150° C. The oxygen partial pressure was than adjusted to 700 kPa partial pressure (total pressure 1200 kPa) and the conditions were monitored for 60 minutes. The slurry was sampled and the sample filtered for solution and solids analysis.

While still maintaining conditions of 150° C. and 700 kPa oxygen partial pressure, the agitated slurry was neutralized by injection of ground roasted fume as a 50% solids slurry in water. The fume solids analysed 64% Zn, 12.0% Pb, 0.40% Fe, 0.167% As, 9 ppm F and 28 ppm (g/t) Ag. The amount of fume added was sufficient that the weight ratio of zinc in the sulphide concentrate feed to zinc in fume was 2:1. The time for reaction of the fume with the zinc concentrate leach slurry was 10 minutes. The neutralized slurry was cooled to 60° C. and sampled for solution and solids analysis. Flocculant (Percol 351, 26 g per tonne) was added to the slurry which thickened to about 50% solids. Clear solution was decanted from the thickened slurry which was subjected to a zinc dissolution step. (See Example 2).

Results for the pressure leach and fume addition steps are summarized in Table 1.

TABLE 1

| Stage | Item | Solids (g/L) | Zn | Fe | Fe$^{2+}$ | Pb | H$_2$SO$_4$ | S° | S(SO$_4$) | Ag (ppm) | As | Cu | Cd | F |
|---|---|---|---|---|---|---|---|---|---|---|---|---|---|---|
| Pressure Leach | Electrolyte | | 50 | — | | — | 180 | — | — | — | — | — | — | — |
| | Concentrate | 148 | 53.8 | 8.47 | — | 0.943 | — | 31.5 (S$_T$) | — | 20 | 0.042 | 0.069 | 0.19 | 0.0202 |
| | Solution | | 127 | 12.6 | 0.57 | | 32 | | | | 0.079 | 0.090 | 0.32 | 0.030 |
| | Residue | 53 | 2.45 | 0.70 | | 1.78 | | 81.8 | | 56 | | | | |
| Fume Addition | Fume | 62.5 | 64.0 | 0.40 | | 12 | | | | 28 | 0.167 | 0.091 | 0.017 | 0.0009 |
| | Solution | | 151 | 0.004 | <0.01 | | pH5.2 | | | 0.1 | 0.0005 | 0.018 | 0.308 | 0.0098 |
| | Residue | 94.5 | 7.32 | 13.3 | | 9.0 | | 42.6 | 3.61 | 50 | | | | |

The initial zinc extraction from the zinc concentrate was 97.5%. The solution at this stage contained high concentrations of arsenic (0.079 g/L) and fluoride (0.030 g/L) due to high excess acid leach conditions which left 32 g/L acid in solution at the end of the pressure leach stage. The addition of zinc oxide fume rapidly neutralized the excess acid, resulting in nearly complete iron and arsenic precipitation and extensive fluoride precipitation. The final solution composition was pH 5.2, 152 g/L Zn, 0.004 g/L Fe, 0.005 g/L As, 0.0098 g/L F. This solution is suitable for zinc dust purification and subsequent zinc electrowinning without an intermediate iron removal stage.

The overall zinc extraction after the addition of fume was 94.2% due to incomplete dissolution of zinc oxide contained in the fume.

EXAMPLE 2—ZINC DISSOLUTION

Underflow slurry (~50% solids) from Example 1 was agitated at 65° C. and the pH was decreased from 5.2 to 3 by the addition of electrolyte. After 60 minutes retention time at conditions of pH3 and 65° C., the slurry was sampled for solution and solids analysis. The remainder of the slurry was filtered and washed prior to elemental sulphur recovery by flotation. Results for the zinc dissolution tests are summarized in Table 2.

TABLE 2

| Item | Solids Conc. g/L | Zn | Fe | Fe$^{2+}$ | Pb | H$_2$SO$_4$ | S° | S(SO$_4$) | Ag (ppm) | As | Cu | Cd | F |
|---|---|---|---|---|---|---|---|---|---|---|---|---|---|
| IN: | | | | | | | | | | | | | |
| Underflow Slurry: | | | | | | | | | | | | | |
| Solution | | 151 | 0.004 | | | pH5.2 | | | | 0.0005 | 0.018 | 0.308 | 0.0098 |
| Solids | 540 | 7.32 | 13.3 | | 9.0 | | 42.6 | 3.61 | 50 | | | | |
| Electrolyte | | 50 | | | | 180 | | | | | | | |
| OUT: | | | | | | | | | | | | | |
| Solution | | 156 | 0.013 | 0.01 | | pH3.2 | | | | 0.016 | 0.401 | 0.258 | 0.033 |
| Residue | 431 | 2.22 | 13.5 | | 8.93 | | 50.6 | 3.38 | 51 | 0.253 | 0.10 | 0.006 | |

The zinc concentration in the solids was reduced from 7.32% from 2.22%, corresponding to an overall zinc extraction of 98.4% from the combined zinc sulphide concentrate and zinc oxide fume feed solids. By maintaining pH 3 in the zinc dissolution step, the re-dissolution of impurities precipitated in the fume neutralization step, such as iron, arsenic and fluoride, were minimized. Although some re-dissolution does occur, the solution containing the redissolved impurities is washed out of the solids and recycled back to the pressure leach operation.

EXAMPLE 3—ZINC DISSOLUTION

Additional testwork on the zinc dissolution step were conducted with pressure leach solids after the elemental sulphur had been separated by flotation. The solids then analysed Zn-14.7%, Fe-17.7%, S°-0.05%, Pb-9.85%. The solids were repulped in water to 388 g dry solids L and H$_2$SO$_4$ added in different tests to yield pH 3, 2 or 1. The results are shown in Table 3.

TABLE 3

Effect of pH on Zinc Dissolution

Feed Solids: Flotation Tailings  Zn  Fe  S°  Pb
                                 14.7 17.7 0.05 9.85 (%)

Conditions: Solids repulped in water to 388g dry solids /L
Slurry heated to 65° C.
H$_2$SO$_4$ added to yield pH 2.9, 1.9, or 1.0

| pH | Time (min) | pH | H$_2$SO$_4$ | Fe | Fe$^{++}$ | Residue Zn(%) | Zinc Dissolution Step | Fume Overall | Conc. + Fume Overall | Iron Redissolution (%) |
|---|---|---|---|---|---|---|---|---|---|---|
| 3.0 | 30 | 2.9 | <1 | 0.026 | 0.026 | 2.53 | 91.5 | 97.1 | 98.0 | 0.031 |
| | 60 | 2.9 | <1 | 0.028 | 0.028 | 2.52 | 91.5 | 97.1 | 98.0 | 0.033 |
| 2.0 | 30 | 1.9 | 2.7 | 0.13 | 0.05 | 2.46 | 91.9 | 97.3 | 98.1 | 0.16 |
| | 60 | 1.9 | 2.8 | 0.11 | 0.09 | 2.42 | 92.1 | 97.3 | 98.2 | 0.14 |
| 1.0 | 30 | 1.0 | 22.5 | 1.02 | 0.11 | 2.33 | 92.6 | 97.5 | 98.2 | 1.3 |
| | 60 | 1.0 | 23.5 | 1.22 | 0.14 | 2.32 | 92.6 | 97.5 | 98.2 | 1.6 |

High extraction of the residual zinc oxide was obtained at pH3 after 30 to 60 minutes retention time with minimal redissolution of the iron precipitated in the fume neutralization step. At pH2 or pH1, zinc extraction was marginally higher but more redissolution of precipitated iron occurred.

The overall zinc extraction from the zinc oxide fume of 97.1% was obtained when the zinc dissolution step was conducted at pH2.9 (i.e. essentially pH3). In this example, the extraction of zinc from concentrate in the initial pressure leach stage was 98.5%. Therefore, the overall extraction of zinc from concentrate and fume was 98.0%.

EXAMPLE 4—RESIDUE FLOTATION AND ELEMENTAL SULPHUR RECOVERY

Solids from the zinc dissolution step were thoroughly washed and then subjected to flotation for separation of elemental sulphur. The washed solids were repulped in water to a pulp density of 1145 g/L (~23% solids) and the resulting transferred to a 2L laboratory flotation cell. A frother, Dowfroth 200, was added and flotation commenced to yield an elemental sulphur concentrate and a lead sulphate/lead jarosite/gangue tailings. Results are summarized in Table 4.

TABLE 4

| Item | Amount (g) | Ag (ppm) | As | Cu | Fe | Pb | S° | S(SO$_4$) | Zn |
|---|---|---|---|---|---|---|---|---|---|
| | | | Analysis (%) | | | | | | |
| Feed | 529.4 | 51 | 0.253 | 0.10 | 13.5 | 8.93 | 50.6 | 3.38 | 2.22 |
| Concentrate | 267.2 | 17 | 0.02 | 0.10 | 0.53 | 0.14 | 96.0 | 0.10 | 1.24 |
| Tailings | 262.2 | 85 | 0.49 | 0.10 | 26.8 | 17.9 | 4.27 | 6.72 | 3.22 |
| | | | Distribution (%) | | | | | | |
| Concentrate | 50.5 | 16.9 | 4 | 50 | 2.0 | 0.8 | 95.8 | 1.5 | 28 |
| Tailings | 49.5 | 83.1 | 96 | 50 | 98.0 | 99.2 | 4.2 | 98.5 | 72 |

The flotation concentrate contained 96% of the elemental sulphur but only 0.8% of the lead and only 17% of the silver. Melting and hot filtration of the flotation concentrate (grading 96% S°) producted a high grade elemental sulphur product suitable for sale for sulphuric acid production.

EXAMPLE 5—IRON REMOVAL

Flotation tailings contained 95-98% of the lead, 95% of the iron and over 70 to 85% of the silver in the feed solids to the process (based on zinc sulphide concentrate and zinc oxide fume added to the pressure leach/fume addition stages).

The flotation tailings analysed typically 3.2% Zn, 17.9% Pb, 26.8% Fe, 6.75% S(SO$_4$) and 85 ppm Ag. It was estimated by chemical and X-ray diffraction analysis of the solids that the residue composition was as follows:

| Lead jarosite | 44.0% |
|---|---|
| Lead sulphate | 14.0% |
| Iron oxide | 19.7% |
| Gangue* | Balance |

(*Includes elemental sulphur, calcium sulphate, silica, etc.)

The iron distribution was estimated to be 48.7% as lead jarosite and 51.3% as iron oxide while the lead distribution was 44.5% as lead jarosite and 55.5% as lead sulphate. The flotation tailings solids were subjected to an acid dissolution step for iron removal to upgrade the lead and silver content for subsequent treatment in a lead smelter.

Results for the two-stage countercurrent leach of the flotation tailings are summarized in Table 5.

TABLE 5

| Test No | Initial Solution (g/L) H$_2$SO$_4$ | Fe$^{3+}$ | Filtrate (g/L) H$_2$SO$_4$ | Fe$_T$ | Fe$^{++}$ | Ag (mg/L) | Residue % of Feed | Analysis (%) Zn | Pb | Fe | S(SO$_4$) | Ag (ppm) | Fe Extraction (%) |
|---|---|---|---|---|---|---|---|---|---|---|---|---|---|
| | | | | | | | Head: | 3.22 | 17.9 | 26.8 | 6.72 | 85 | |
| 1 First Stage | 139.5 | 41.7 | 18 | 85 | 3.7 | 0.4 | | | | | | | 51 |
| Second Stage | 250 | — | 161.5 | 31.7 | | 14.4 | 44.8 | 1.19 | 39.4 | 7.12 | 8.04 | 86 | 37 (88.1)** |
| 2 First Stage | 99.2 | 30.9 | 14.5 | 55 | | | | | | | | | 28 |
| Second Stage | 200 | — | 116.5 | 29.4 | | | 65.4 | 2.43 | 26.9 | 15.4 | 9.06 | | 34 (62.4)* |
| 3 First Stage | 139 | 30.4 | 19 | 74 | 3.4 | | | | | | | | 51 |
| Second Stage | 225 | — | 141 | 29.7 | 0.65 | | 47.0 | 1.44 | 37.7 | 8.17 | 8.40** | | 35 (85.7)* |

*Total Fe extracted based on final residue analyses

In the first stage leach, the flotation tailings were leached at 90° to 95° C. with strong acid solution from the second stage leach. Here, the excess acid required to decompose the lead jarosite was neutralized by reaction with the more readily soluble iron oxide in the flotation tailings. The iron extraction in the first stage leach was 51%. After liquid-solid separation, the residue was subjected to the strong acid second stage leach at 90° to 95° C. where the initial acid concentration was 225 to 250 g/L. The iron extraction was 35 to 37% for an overall total iron extraction of 85.7%. The final residue analyzed 37.7% Pb, 8.17% Fe, 8.4% S(SO$_4$) and 86 ppm Ag.

The residue contained an estimated 27.6% lead jarosite and 47.8% lead sulphate; in the two stage leach all of the iron oxide was dissolved and 71% of the lead jarosite was decomposed to lead sulphate and soluble ferric sulphate.

After liquid-solid separation on the first stage leach slurry, the iron solution containing 19 g/L H$_2$SO$_4$ and 74 g/L Fe was neutralized with limestone to pH3 and with lime to pH8 at 85° to 90° C. The final solution contained less than 1 mg/L fe. The neutralized slurry was thickened to a terminal density of 62% solids, suitable for pumping to a final tailings disposal area.

Other embodiments and examples of the invention will be readily apparent to a person skilled in the art, the scope of the invention being defined in the appended claims.

What we claim as new and desire to protect by Letters Patent of the United States is:

1. A process for recovering zinc from zinc-containing sulphidic material also containing iron and from zinc oxide containing material, at least one of the zinc containing materials also containing at least one of the metals selected from the group consisting of lead and silver, the process comprising leaching zinc-containing sulphidic material under pressurized oxidizing conditions at a temperature in the range of from about 130° to about 170° C. in aqueous sulphuric acid solution with an initial stoichiometric excess of sulphuric acid relative to the zinc content of the sulphidic material to form a leach slurry containing dissolved zinc and iron, continuing the leach step until a substantial amount of zinc has been dissolved from the sulphidic material, injecting zinc oxide containing material into the leach slurry while maintaining said said pressurized oxidizing conditions and temperature to raise the pH of the slurry to a value in the range of from about 4.5 to about 5.5 to precipitate dissolved iron and form an iron-containing residue and a relatively iron-free leach solution, said residue also containing sulphur and said at least one metal, separating the residue from the leach solution, treating the leach solution to recover zinc, separating elemental sulphur and unreacted zinc containing material from the residue, and leaching the remaining residue in aqueous sulphuric acid solution in an iron removal step to dissolve iron and form a residue enriched in said at least one metal.

2. A process according to claim 1 wherein the zinc oxide containing material is injected into the leach slurry to raise the pH of the slurry to about 5.

3. A process according to claim 1 wherein the leach step is continued until at least about 95% by weight zinc has been dissolved from the zinc sulphidic material before injecting the zinc oxide containing material.

4. A process according to claim 1 wherein the zinc sulphidic material contains by weight from about 45 to about 55% zinc and from about 8 to about 15% iron.

5. A process according to claim 1 wherein the zinc oxide containing material contains by weight from about 60 to about 70% zinc.

6. A process according to claim 5 wherein the zinc oxide containing material comprises zinc oxide fume obtained from lead blast furnace slag.

7. A process according to claim 1 wherein the initial stoichiometric excess of sulphuric acid in the leach step is from about 30 to about 100%.

8. A process according to claim 7 wherein the initial stoichiometric excess of sulphuric acid in the leach step is from about 40 to about 60%.

9. A process according to claim 1 wherein the iron-containing residue separated from the leach solution also contains zinc oxide containing material, and before said sulphur separation the residue is leached in a second leach step in aqueous sulphuric acid solution to form a further leach solution containing dissolved zinc and a further residue, and the further residue is separated from the further leach solution and subjected to said sulphur separation and said iron removal step.

10. A process according to claim 9 wherein the second leach step is carried out at atmospheric pressure at a pH in the range of from about 2 to about 3 and at a temperature in the range of from about 60° to about 90° C.

11. A process according to claim 9 wherein the further leach solution is recycled to the first-mentioned leach step.

12. A process according to claim 1 wherein the iron removal step comprises a first stage in which the iron-containing residue is leached in leach solution from a second stage to form an intermediate residue and an iron-containing solution, the iron-containing solution is separated from the intermediate residue, the intermediate residue is leached in the second stage in aqueous sulphuric acid solution stronger than that in the first stage to form said enriched residue and a leach solution, and the leach solution is separated from the enriched residue and recycled to the first stage.

* * * * *